UNITED STATES PATENT OFFICE.

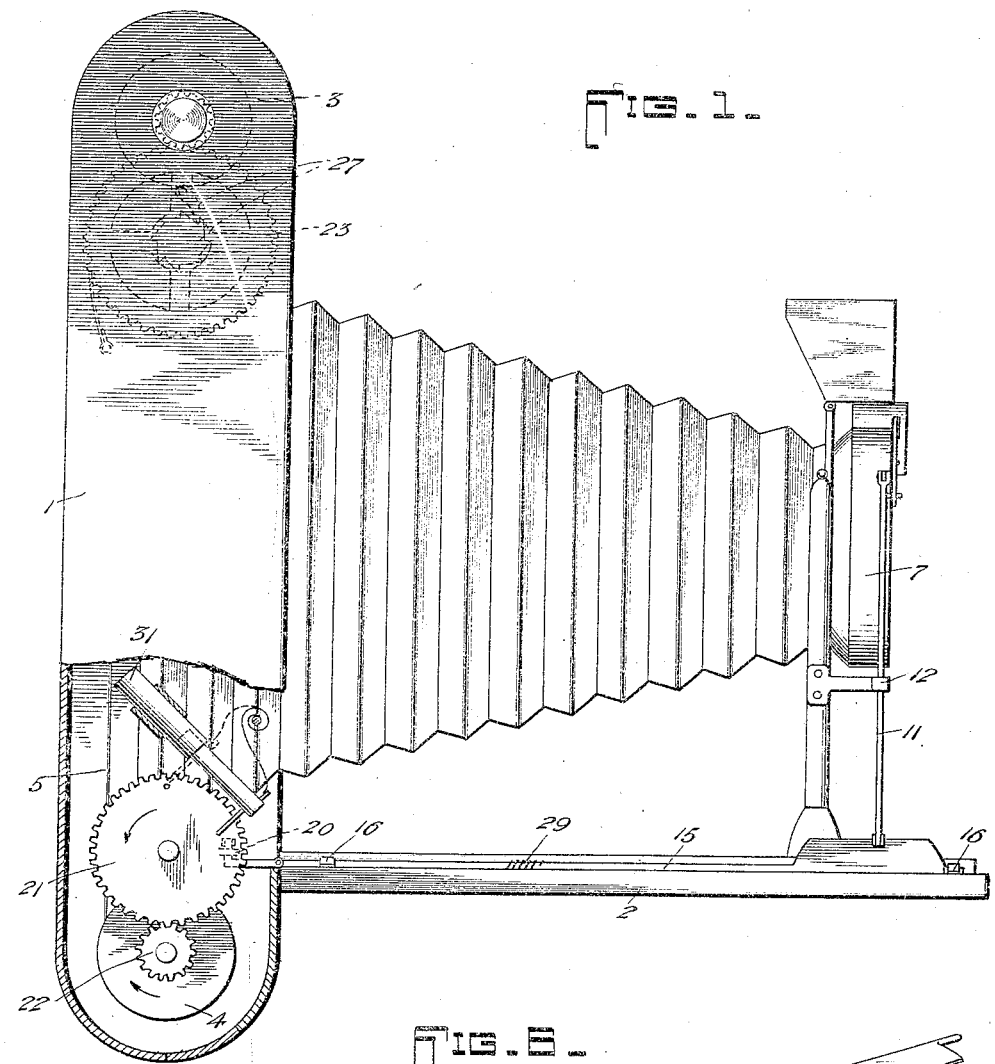
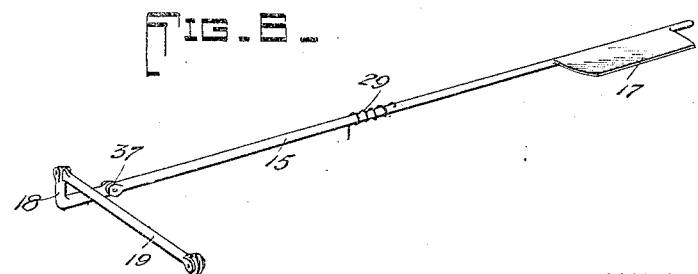

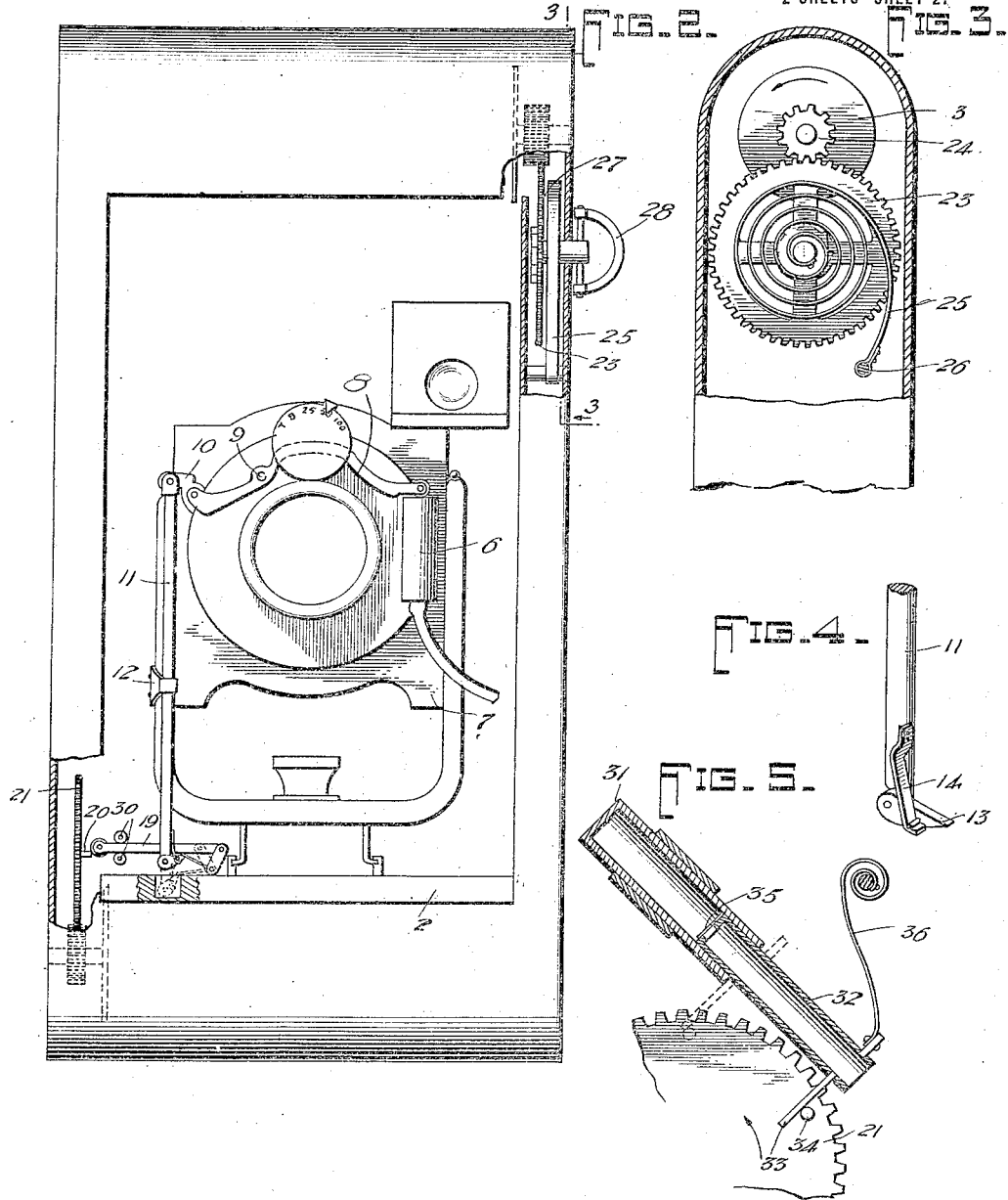

JOHN LUDVIG JOHNSON, OF SEATTLE, WASHINGTON.

CAMERA.

1,266,810.

Specification of Letters Patent.

Patented May 21, 1918.

Application filed December 10, 1917. Serial No. 206,429.

*To all whom it may concern:*

Be it known that I, JOHN LUDVIG JOHNSON, a citizen of the United States, and a resident of Seattle, in the county of King and State of Washington, have invented certain new and useful Improvements in Cameras, of which the following is a specification.

My invention is an improvement in cameras, and has for its object to provide a camera of the repeating type, wherein the film winding means is spring operated and normally restrained from action, and released by the snap of the shutter to present a new stretch of film after each exposure, and wherein means is provided for checking the action of the film winding means when a predetermined length of film is in exposing position.

In the drawings:

Figure 1 is a side view of a camera constructed in accordance with the improvement, and with parts in section;

Fig. 2 is a front view, with parts broken away;

Fig. 3 is a section on the line 3—3 of Fig. 2, looking in the direction of the arrow adjacent the line;

Fig. 4 is a perspective view of the tripping mechanism;

Fig. 5 is an enlarged detail section of the check mechanism;

Fig. 6 is a perspective view of the trip rod.

The present embodiment of the invention is shown in connection with a camera 1 of the kodak type, having the usual front extension plate 2, and film carrying reels 3 and 4 are journaled at the ends of the body, upon which the film 5 winds. The usual shutter operating mechanism, indicated at 6, is provided on the extension front 7 of the camera, and a lever 8 is pivoted at 9 to the lens support, the said lever having at that end adjacent to the shutter operating mechanism a roller which is adapted to be engaged by the said mechanism to swing the lever. That end of the lever remote from the shutter operating mechanism is pivoted to one end of a lever 10, also pivotally mounted on the extension front and connected at its outer end to a vertically slidable link 11. This link slides in a bearing 12 on the extension front, and the lower end has a trip 13 pivotally connected with the link and normally held by a spring 14 in a position extending laterally from the link.

It will be noticed that the trip has a pin which is engaged by the spring in such manner that while the link may be swung freely upward, it cannot swing downward. A trip rod 15 is arranged in bearings 16 on the extension plate, and at its front end this rod has a wing or vane 17 which is adapted to be engaged by the trip 13 to oscillate the rod. The rod has an upstanding arm 18 at its inner end, and a stop rod 19 is pivotally connected with the arm at one end of the rod, the other end of the rod having a roller for engaging a stop 20 on a gear wheel 21 journaled in the body of the camera adjacent to the film reel 4. This gear wheel meshes with a pinion 22 on the reel shaft, and a similar gear wheel 23 is journaled at the opposite end of the camera body adjacent to the reel 3. This gear wheel 23 meshes with a pinion 24 on the reel shaft, and the said gear wheel 23 is normally controlled by a spring 25 in a direction to cause the film winding mechanism, that is, the reels 3 and 4, to wind the film from one reel to the other.

One end of the spring 25 is connected with the camera casing, as indicated at 26, and the other is connected with the gear wheel 23. Pawl and ratchet mechanism, indicated at 27, is provided for preventing reverse rotation of the gear wheel under the influence of the spring, and a handle 28 is connected with the gear wheel to permit the spring to be wound.

The rod 15 is normally acted upon by a spring 29, to press the stop rod 19 toward the stop 20, that is, toward the gear wheel 21 and into engaging position with the stop 20. As soon as the vane 17 is released by the rod 11, the spring 29 will return the rod to original position. The rod 19 is guided in its movement toward and from the gear wheel 21 by rollers 30 arranged above and below the arm.

In operation, when the camera is loaded, the spring 25 is wound. When the first exposure is made, the shutter operating mechanism will swing the lever 8, to cause the rod 11 to engage the vane 17 to oscillate the rod 15, to move the rod 19 out of engagement with the stop 20. This releases the spring controlled film winding mechanism, and the gear wheel 21 will be rotated one complete turn before the stop 20 again engages the stop rod 19. The relation between the parts is such that a complete rotation of the gear wheel 21 will move the exposed film away from exposing position and move the new length of film into position.

Mechanism is provided for checking and cushioning the stoppage of the film winding mechanism, the said mechanism being shown more particularly in Figs. 1 and 5. This mechanism comprises a cylinder 31 which is held adjacent to the gear wheel 21, and a piston 32 is mounted to move longitudinally of the cylinder. This piston has a radially extending arm 33 which is in position to be engaged by a pin 34 on the gear wheel, just before the stop 20 comes into engagement with the stop rod 19. The piston has a port in its end, which is provided with a check valve 35 so arranged that while the piston may move freely outward in the cylinder the valve will close when the piston moves inward. The piston is normally moved outward by a spring 36, connected at one end to the piston and at the other to the casing of the camera. Just before the stop 20 comes into engagement with the rod 19 the pin 34 will engage the arm 33 of the piston, and will move the piston inwardly in the cylinder against the resistance of the air therein. The piston or the cylinder has a bleed vent or by-pass which is of the proper size to cause the right amount of resistance. It will be noticed that the rod 15 is sectional, the connection 37 between the sections being in line with the hinge connection of the extension plate 2, so that the rod may fold with the extension plate. In this camera the handles connected with the film reels are dispensed with, the handle 28 being similar to the usual handles. The blade or vane 17 is made long enough to permit the focusing of the camera.

I claim:

1. In a camera, the combination with the film reels and the shutter operating mechanism, of a spring for operating the reels and normally operated to move the film in one direction, means for restraining the operation of the said means, means controlled by the tripping of the shutter for releasing the restraining means, means in connection with the restraining means for checking the operation of the spring when a predetermined amount of film has been moved, means for cushioning the operation of the checking means, said last named means comprising a piston cylinder, a piston movable therein and having a check valve for permitting the piston to move freely outward and for checking the movement of the piston inward, a spring normally moving the piston outward, and means in connection with one of the reels for moving the said piston inwardly.

2. In a camera, the combination with the film reels and the shutter operating mechanism, of a spring for operating the reels and normally operated to move the film in one direction, means for restraining the operation of the said means, means controlled by the tripping of the shutter for releasing the restraining means, means in connection with the restraining means for checking the operation of the spring when a predetermined amount of film has been moved, and means for cushioning the operation of the checking means.

3. In a camera, normally operative means for moving the film, means for restraining the operation of the film moving means, a shutter means controlled by the tripping of the shutter for releasing the restraining means, means for checking the operation of the film moving means when a predetermined amount of film has been moved, and means for cushioning the operation of the checking means, said last named means comprising a dashpot for engagement by the moving means at predetermined intervals.

4. In a camera, normally operative means for moving the film, means for restraining the operation of the film moving means, a shutter means controlled by the tripping of the shutter for releasing the restraining means, and means for checking the operation of the film moving means when a predetermined amount of film has been moved.

JOHN LUDVIG JOHNSON.

Witnesses:
GEORGE GREGORY.
GEORGE MOYER.